(12) United States Patent
Numazaki et al.

(10) Patent No.: US 12,480,588 B2
(45) Date of Patent: Nov. 25, 2025

(54) VALVE ASSEMBLY

(71) Applicant: JTEKT CORPORATION, Kariya (JP)

(72) Inventors: Kazushi Numazaki, Toyota (JP); Natsuki Iwamoto, Okazaki (JP); Toshikatsu Kubo, Obu (JP); Keiichiro Kitahara, Nagoya (JP)

(73) Assignee: JTEKT CORPORATION, Kariya (JP)

( * ) Notice: Subject to any disclaimer, the term of this patent is extended or adjusted under 35 U.S.C. 154(b) by 37 days.

(21) Appl. No.: 18/703,810

(22) PCT Filed: Nov. 9, 2021

(86) PCT No.: PCT/JP2021/041144
§ 371 (c)(1),
(2) Date: Apr. 23, 2024

(87) PCT Pub. No.: WO2023/084585
PCT Pub. Date: May 19, 2023

(65) Prior Publication Data
US 2024/0418277 A1    Dec. 19, 2024

(51) Int. Cl.
*F16K 27/02* (2006.01)
*F16K 15/18* (2006.01)
(Continued)

(52) U.S. Cl.
CPC ...... *F16K 15/1826* (2021.08); *F16K 27/0209* (2013.01); *F16K 31/42* (2013.01);
(Continued)

(58) Field of Classification Search
None
See application file for complete search history.

(56) References Cited

U.S. PATENT DOCUMENTS

| 2,969,088 A | * | 1/1961 | Kramer | F16K 31/408 |
| | | | | 251/38 |
| 7,730,905 B2 | * | 6/2010 | Suzuki | F17C 13/04 |
| | | | | 251/30.03 |

(Continued)

FOREIGN PATENT DOCUMENTS

| JP | 2003-240148 A | 8/2003 |
| JP | 2013-53660 A | 3/2013 |

(Continued)

OTHER PUBLICATIONS

International Search Report mailed on Dec. 7, 2021 in PCT/JP2021/041144 filed on Nov. 9, 2021 (2 pages).

*Primary Examiner* — Matthew W Jellett
(74) *Attorney, Agent, or Firm* — Oblon, McClelland, Maier & Neustadt, L.L.P.

(57) ABSTRACT

A composite valve sub assembly includes a tubular sleeve inserted into a single attachment hole of a body; an electromagnetic valve body housed in the sleeve; a solenoid actuator configured to move the electromagnetic valve body in the sleeve; a plug fixed at an end portion of the sleeve and disposed between the sleeve and a bottom surface of the attachment hole; and a check valve body disposed on the opposite side of the electromagnetic valve body from the plug. The plug has an internal flow path including a first opening connected to a first flow path of the body and opened and closed by the electromagnetic valve body, and a second opening connected to a second flow path of the body and opened and closed by the check valve body.

7 Claims, 3 Drawing Sheets

(51) Int. Cl.
*F16K 31/42* (2006.01)
*F17C 13/04* (2006.01)

(52) U.S. Cl.
CPC .......... *F17C 13/04* (2013.01); *F16K 27/0254* (2013.01); *F17C 2205/0326* (2013.01); *F17C 2221/012* (2013.01); *F17C 2270/0168* (2013.01); *F17C 2270/0184* (2013.01)

(56) References Cited

U.S. PATENT DOCUMENTS

| | | | | |
|---|---|---|---|---|
| 7,984,890 B2 * | 7/2011 | Pfaff | ................... | G05D 7/0635 |
| | | | | 251/30.01 |
| 8,151,819 B2 * | 4/2012 | Suzuki | ................... | F17C 13/04 |
| | | | | 137/320 |
| 8,307,842 B2 * | 11/2012 | Nakata | ................... | F16K 1/30 |
| | | | | 137/320 |
| 8,316,877 B2 * | 11/2012 | Numazaki | ......... | H01M 8/04201 |
| | | | | 251/144 |
| 8,870,152 B2 * | 10/2014 | Nagata | ................... | F16K 31/408 |
| | | | | 251/30.04 |
| 9,593,873 B2 * | 3/2017 | Lundberg | ................. | F25B 45/00 |
| 10,890,271 B2 * | 1/2021 | Numazaki | ............. | F16K 27/029 |
| 10,907,749 B2 * | 2/2021 | Lee | ..................... | F16K 31/0693 |
| 2003/0151018 A1 | 8/2003 | Teshima et al. | | |
| 2009/0050222 A1 * | 2/2009 | Jackson | ............... | F15B 13/0433 |
| | | | | 137/625.65 |
| 2009/0146094 A1 | 6/2009 | Suzuki et al. | | |
| 2009/0184271 A1 * | 7/2009 | Croibier | .............. | G01M 3/2876 |
| | | | | 251/30.01 |
| 2015/0184805 A1 | 7/2015 | Lee | | |
| 2021/0396327 A1 | 12/2021 | Iwamoto et al. | | |

FOREIGN PATENT DOCUMENTS

| | | |
|---|---|---|
| JP | 2015-523509 A | 8/2015 |
| JP | 2022-3262 A | 1/2022 |
| WO | WO 2006/054483 A1 | 5/2006 |

* cited by examiner

VALVE ASSEMBLY

TECHNICAL FIELD

The present disclosure relates to a valve assembly.

BACKGROUND ART

Patent Document 1, for example, discloses a valve assembly that controls a gas flow. Such a valve assembly is mounted to a gas tank of a fuel cell electric vehicle, for example, to control a hydrogen gas flow.

The valve assembly according to Patent Document 1 includes a plurality of valve sub assemblies that includes an electromagnetic valve and a check valve, and a body to which the valve sub assemblies are attached. The body includes a gas flow path through which a hydrogen gas flows, an attachment hole for the electromagnetic valve that communicates with the gas flow path, and an attachment hole for the check valve that communicates with the gas flow path. The valve assembly is assembled by attaching the electromagnetic valve to the attachment hole for the electromagnetic valve and attaching the check valve to the attachment hole for the check valve.

RELATED ART DOCUMENTS

Patent Documents

Patent Document 1: Japanese Unexamined Patent Application Publication (Translation of PCT Application) No. 2015-523509 (JP 2015-523509 A)

SUMMARY OF THE INVENTION

Problem to be Solved by the Invention

In the valve assembly according to Patent Document 1, the electromagnetic valve and the check valve are attached to the body as individual valve sub assemblies that are independent of each other. Thus, it is necessary to form, in the body, individual attachment holes for the electromagnetic valve and the check valve that communicate with the gas flow path, in addition to the gas flow path, complicating the internal structure of the body.

Means for Solving the Problem

One aspect of the present disclosure provides a valve assembly. The valve assembly includes a body and a composite valve sub assembly attached to the body. The body includes a gas flow path including a first flow path configured to be connected to a gas tank and a second flow path configured to be connected to an external device, and a single attachment hole that communicates with each of the first flow path and the second flow path. The composite valve sub assembly includes a tubular sleeve inserted into the attachment hole, an electromagnetic valve body housed in the sleeve, a solenoid actuator configured to move the electromagnetic valve body in the sleeve, a plug fixed at an end portion of the sleeve and disposed between the sleeve and a bottom surface of the attachment hole, and a check valve body disposed on an opposite side of the electromagnetic valve body from the plug. The plug has an internal flow path including a first opening connected to the first flow path and opened and closed by the electromagnetic valve body, and a second opening connected to the second flow path and opened and closed by the check valve body.

MODES FOR CARRYING OUT THE INVENTION

A valve assembly according to one embodiment will be described below with reference to the drawings.

The term "tubular" as used herein refers to the shape of any object that may be considered as tubular as a whole, including a plurality of components combined to form a tubular shape and an object with a notch etc. in a part thereof such as a C-shaped object. The "tubular" shape includes, but is not limited to, a circular shape, an elliptical shape, and a polygonal shape with sharp or rounded corners when viewed in the axial direction. The term "annular" as used herein refers to the shape of any object that may be considered as annular as a whole, including a plurality of components combined to form an annular shape and an object with a notch etc. in a part thereof such as a C-shaped object. The "annular" shape includes, but is not limited to, a circular shape, an elliptical shape, and a polygonal shape with sharp or rounded corners when viewed in the axial direction. The term "face" as used herein refers to the relationship of surfaces or members positioned face-to-face with each other, including not only the relationship of surfaces or members positioned perfectly face-to-face with each other but also the relationship of surfaces or members positioned partially face-to-face with each other. Further, the term does not necessarily indicate the relationship of surfaces or members directly facing each other, but may indicate that one surface or member takes an inclined posture with respect to the other. The term "face" as used herein indicates both a case where another member is interposed between two portions and a case where no member is interposed between two portions.

Figure 1:
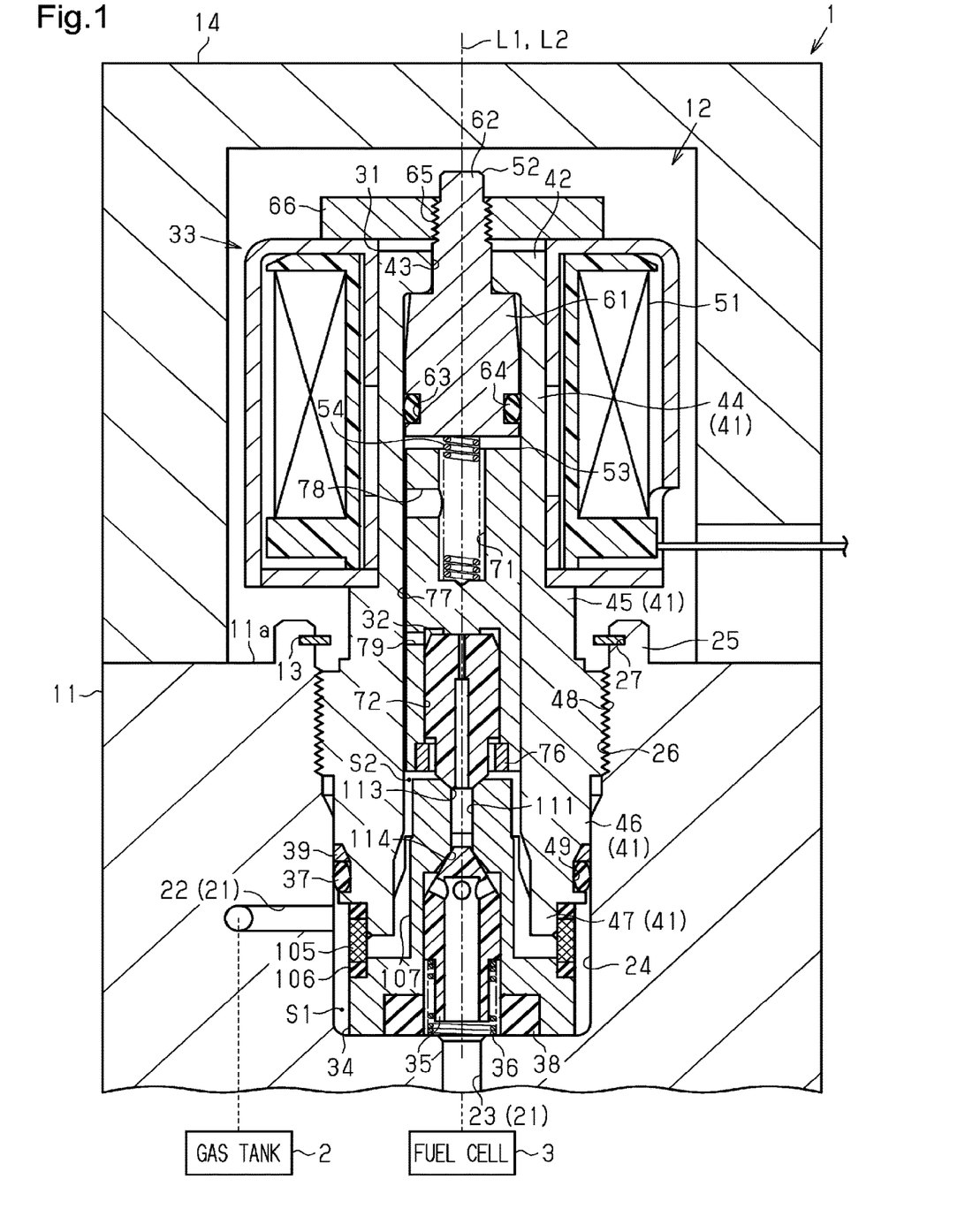
FIG. 1 is a sectional view of a valve assembly according to one embodiment.

A valve assembly 1 illustrated in FIG. 1 is mounted to a gas tank 2 of a fuel cell electric vehicle, by way of example, and connected to a fuel cell 3 as an external device via a pipe (not illustrated). The gas tank 2 stores a hydrogen gas at a high pressure of about 72.5 MPa, for example. The valve assembly 1 controls flows of a hydrogen gas to be charged into the gas tank 2 and a hydrogen gas fed out of the gas tank 2.

The valve assembly 1 includes a body 11 and a composite valve sub assembly 12 assembled to the body 11. The valve assembly 1 further includes a snap ring 13 that prevents the composite valve sub assembly 12 from falling off, and a cover 14 that covers the composite valve sub assembly 12. The valve assembly 1 may further include another valve sub assembly such as a safety valve sub assembly, for example.

In the following description, the side on which the cover 14 is disposed with respect to the body 11 will be referred to as a first side, and the opposite side, that is, the side on which the body 11 is disposed with respect to the cover 14, will be referred to as a second side. The direction from the second side toward the first side will be referred to as a first direction, and the direction from the first side toward the second side will be referred to as a second direction.

(Body 11)

The body 11 is made of a metal material, for example. The body 11 has a gas flow path 21 through which a hydrogen gas flows. The gas flow path 21 includes a first flow path 22 connected to the gas tank 2, and a second flow path 23 connected to the fuel cell 3. The gas flow path 21 may further include a charging flow path connected to a hydrogen station, for example. In that case, a common gas flow path that leads to the outside of the valve assembly 1 may be branched into the second flow path 23 and the charging flow path.

The body 11 has a single attachment hole 24 for the composite valve sub assembly 12, and a protrusion 25 that supports the snap ring 13. The attachment hole 24 opens in a surface 11a of the body 11, and communicates with each of the first flow path 22 and the second flow path 23.

The attachment hole 24 is a round hole, for example. The first flow path 22 opens in the inner peripheral surface of the attachment hole 24, and the second flow path 23 opens in the bottom surface of the attachment hole 24. Female threads 26 are provided on the inner peripheral surface of the attachment hole 24. The female threads 26 are provided on the first side with respect to the opening of the first flow path 22 on the inner peripheral surface of the attachment hole 24.

The protrusion 25 is formed in a circular ring shape, for example. The protrusion 25 projects toward the first side from the peripheral edge portion of the attachment hole 24 in the body 11. A mounting groove 27 that extends in the circumferential direction is provided in the inner peripheral surface of the protrusion 25.

(Snap Ring 13)

The snap ring 13 is a snap ring made of a metal material, for example. The snap ring 13 is mounted in the mounting groove 27. This allows the snap ring 13 to regulate a sleeve 31 of the composite valve sub assembly 12 moving in a direction in which the sleeve 31 slips out, that is, in the first direction, beyond a relief position.

(Cover 14)

The cover 14 is made of a metal material or a resin material, for example. The cover 14 is formed in a tubular shape with one closed end, for example. The cover 14 houses a portion of the composite valve sub assembly 12 exposed from the attachment hole 24. The cover 14 is fixed to the body 11 by a well-known fixing method such as a bolt or a snap-fit structure (not illustrated).

(Composite Valve Sub Assembly 12)

The composite valve sub assembly 12 includes a sleeve 31, an electromagnetic valve body 32, a solenoid actuator 33, a plug 34, a check valve body 35, and a check valve spring 36 as a check valve biasing member. The composite valve sub assembly 12 further includes a first seal member 37 disposed between the inner peripheral surface of the attachment hole 24 and the outer peripheral surface of the sleeve 31, and a second seal member 38 disposed between the bottom surface of the attachment hole 24 and an end surface of the plug 34. The plug 34 is occasionally referred to as a spacer.

The composite valve sub assembly 12 is attached in the attachment hole 24. While the composite valve sub assembly 12 is attached in the attachment hole 24 such that an axis L1 of the composite valve sub assembly 12 is disposed coaxially with an axis L2 of the attachment hole 24 in the illustrated example, the axis L1 and the axis L2 may not necessarily be disposed coaxially with each other.

The function of an electromagnetic valve that controls a flow of a hydrogen gas between the first flow path 22 and the second flow path 23 is implemented by the sleeve 31, the electromagnetic valve body 32, the solenoid actuator 33, and the plug 34. The function of a check valve that allows a flow of a hydrogen gas from the first flow path 22 to the second flow path 23 and that blocks a flow of a hydrogen gas from the second flow path 23 to the first flow path 22 is implemented by the plug 34, the check valve body 35, and the check valve spring 36. The constituent elements will be described in detail below:

(Sleeve 31)

The sleeve 31 is formed in a tubular shape with one closed end, for example. The sleeve 31 has a tubular peripheral wall 41 and an end wall 42 provided at an end portion of the peripheral wall 41 on the first side. The end wall 42 has a through hole 43 that penetrates the end wall 42 in the axial direction. The peripheral wall 41 has a stepped shape in which the outside diameter of the peripheral wall 41 is varied stepwise along the axial direction.

Specifically, the peripheral wall 41 has a small diameter portion 44, an intermediate portion 45, a large diameter portion 46, and a distal end portion 47 arranged in this order from the first side. The outside diameter of the small diameter portion 44 is smaller than the outside diameter of the intermediate portion 45. The outside diameter of the intermediate portion 45 is smaller than the outside diameter of the large diameter portion 46. The outside diameter of the distal end portion 47 is smaller than the outside diameter of the large diameter portion 46.

Male threads 48 and a mounting groove 49 are provided on the outer peripheral surface of the large diameter portion 46. The mounting groove 49 is provided on the second side with respect to the male threads 48 with the sleeve 31 attached to the body 11. The mounting groove 49 is an annular groove that extends over the entire circumference of the sleeve 31.

The sleeve 31 is attached to the body 11 through screwing between the male threads 48 and the female threads 26 of the attachment hole 24. This allows the sleeve 31 to be moved in the axial direction by rotating the sleeve 31. The large diameter portion 46 and the distal end portion 47 are inserted into the attachment hole 24, and the small diameter portion 44 and the intermediate portion 45 project from the body 11.

The large diameter portion 46 is disposed on the second side of the snap ring 13 with the sleeve 31 attached to the body 11. In other words, the snap ring 13 is attached to the body 11 so as to be disposed on the first side of the large diameter portion 46. The outer peripheral edge of the large diameter portion 46 faces the inner peripheral edge of the snap ring 13 in the axial direction.

A back-up ring 39 and the first seal member 37 are mounted in the mounting groove 49. The first seal member 37 is made of a rubber material or a resin material. The first seal member 37 is formed in a circular ring shape, for example. The first seal member 37 is compressed between the inner peripheral surface of the attachment hole 24 and the bottom surface of the mounting groove 49, that is, the outer peripheral surface of the sleeve 31. The first seal member 37 is in contact with a region of the inner peripheral surface of the attachment hole 24 on the first side with respect to the position at which the first flow path 22 opens. That is, the first seal member 37 is disposed closer to an opening end of the attachment hole 24 than the first flow path 22. This allows the gap between the sleeve 31 and the body 11 to be sealed.

Here, the position at which the plug 34 abuts against the bottom surface of the attachment hole 24, as discussed later, and at which the sleeve 31 compresses the second seal member 38 via the plug 34 is referred to as an attachment position. That is, the attachment position is the position at which the sleeve 31 cannot be inserted into the attachment hole 24 any further. On the other hand, the position at which the plug 34 is separated from the bottom surface of the attachment hole 24 and the sleeve 31 does not compress the second seal member 38 in the range in which the first seal member 37 is compressed to maintain the sealing performance is referred to as a relief position. When the sleeve 31 is located at the relief position, the large diameter portion 46 can be moved to a position at which the large diameter portion 46 abuts against the snap ring 13. This regulates movement of the sleeve 31 in the first direction. Thus, the sleeve 31 is movable in the attachment hole 24 between the attachment position and the relief position.

(Solenoid Actuator 33)

The solenoid actuator 33 includes a solenoid coil 51, a fixed core 52, a movable core 53, and an electromagnetic valve spring 54 as an electromagnetic valve biasing member.

The solenoid coil 51 is formed in a cylindrical shape, for example. The solenoid coil 51 is fitted with the outer periphery of the small diameter portion 44. The axial length of the solenoid coil 51 is slightly longer than the axial length of the small diameter portion 44. This allows the solenoid coil 51 to project toward the first side with respect to the small diameter portion 44 with the solenoid coil 51 abutting against a stepped portion of the sleeve 31 between the small diameter portion 44 and the intermediate portion 45.

The fixed core 52 is made of a magnetic material. The fixed core 52 is formed in a stepped circular column shape, for example. The fixed core 52 is fixed in the sleeve 31.

In the illustrated example, the fixed core 52 has a body portion 61 and a fixed shaft portion 62 that projects from the body portion 61 toward the first side. The body portion 61 is fitted with the inner periphery of the sleeve 31. A mounting groove 63 is provided in the outer peripheral surface of the body portion 61. The mounting groove 63 is formed in a circular ring shape to extend over the entire circumference of the fixed core 52. A third seal member 64 is mounted in the mounting groove 63. The third seal member 64 is made of a rubber material or a resin material. The third seal member 64 is compressed between the inner peripheral surface of the sleeve 31 and the outer peripheral surface of the fixed core 52. This allows the gap between the sleeve 31 and the fixed core 52 to be sealed.

The fixed shaft portion 62 is inserted into the through hole 43 to project to the outside of the sleeve 31. Male threads 65 are provided on the outer peripheral surface of the fixed shaft portion 62. The fixed core 52 is fixed to the sleeve 31 by screwing a lock nut 66 to the fixed shaft portion 62.

In the illustrated example, the outside diameter of the lock nut 66 is larger than the outside diameter of the small diameter portion 44 of the sleeve 31, and the outer peripheral edge of the lock nut 66 faces the solenoid coil 51 in the axial direction. The lock nut 66 fixes the solenoid coil 51 by pressing the solenoid coil 51 against the stepped portion between the small diameter portion 44 and the intermediate portion 45.

The movable core 53 is made of a magnetic material. The movable core 53 is formed in a circular column shape, for example. The movable core 53 is disposed adjacent to the fixed core 52 on the second side in the sleeve 31. The movable core 53 is movable in the axial direction while rubbing against the inner peripheral surface of the sleeve 31.

In the illustrated example, the movable core 53 has a spring housing hole 71 that opens on the first side, and an electromagnetic valve body housing hole 72 that opens on the second side. The electromagnetic valve body housing hole 72 has a stepped shape in which the bore diameter of the electromagnetic valve body housing hole 72 is varied stepwise along the axial direction.

Figure 2:
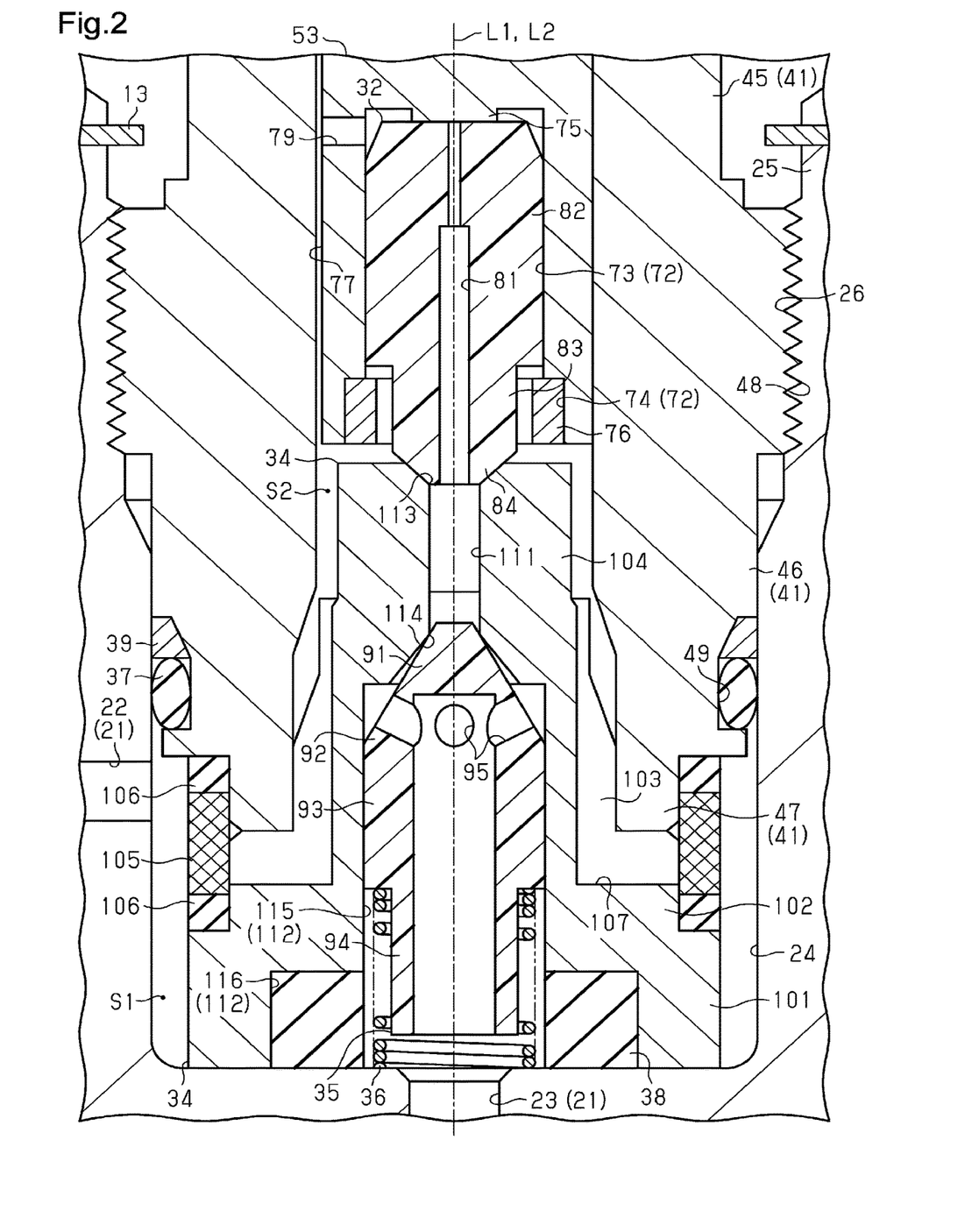
FIG. 2 is an enlarged sectional view of the vicinity of an attachment hole in the valve assembly in FIG. 1.

Specifically, as illustrated in FIG. 2, the electromagnetic valve body housing hole 72 has a main hole portion 73 and an expanded diameter hole portion 74 provided on the second side of the main hole portion 73. A seat portion 75 that projects toward the second side is provided on the bottom surface of the main hole portion 73, that is, on the bottom surface of the electromagnetic valve body housing hole 72. The seat portion 75 is formed in a circular plate shape, for example. The bore diameter of the expanded diameter hole portion 74 is larger than the bore diameter of the main hole portion 73. A retention ring 76 is fixed in the expanded diameter hole portion 74. The bore diameter of the retention ring 76 is smaller than the bore diameter of the main hole portion 73.

As illustrated in FIGS. 1 and 2, an introduction groove 77 is provided in the outer peripheral surface of the movable core 53. The introduction groove 77 is formed in a straight shape to extend over the entire region of the movable core 53 in the axial direction. Further, the movable core 53 has a first introduction hole 78 that communicates the introduction groove 77 with the spring housing hole 71, and a second introduction hole 79 that communicates the introduction groove 77 with the electromagnetic valve body housing hole 72. The second introduction hole 79 is provided close to the bottom surface of the electromagnetic valve body housing hole 72.

The electromagnetic valve spring 54 is a compression coil spring in the illustrated example. The electromagnetic valve spring 54 is housed in a compressed state in the spring housing hole 71. This allows the electromagnetic valve spring 54 to bias the movable core 53 toward the second side at all times.

(Electromagnetic Valve Body 32)

The electromagnetic valve body 32 is made of a resin material, for example. The electromagnetic valve body 32 is formed in a stepped circular column shape, for example. The electromagnetic valve body 32 is coupled to the movable core 53 so as to be movable in the axial direction according to movement of the movable core 53. The electromagnetic valve body 32 according to the present embodiment is constituted as a pilot valve. When the movable core 53 is attracted by the fixed core 52, only the movable core 53 is moved in the axial direction in a range set in advance, and the electromagnetic valve body 32 is moved in the axial direction together with the movable core 53 when such a range is exceeded.

Specifically, as illustrated in FIG. 2, the electromagnetic valve body 32 has a pilot flow path 81. The pilot flow path 81 penetrates the electromagnetic valve body 32 in the axial direction. The electromagnetic valve body 32 has a trunk portion 82, a neck portion 83, and a head portion 84 arranged in this order from the first side. The electromagnetic valve body 32 is housed in the electromagnetic valve body housing hole 72. The electromagnetic valve body 32 is movable in the axial direction while rubbing against the inner peripheral surface of the electromagnetic valve body housing hole 72. The axial length of the trunk portion 82 is set to such a length that the trunk portion 82 does not project from the main hole portion 73 of the electromagnetic valve body housing hole 72 with the electromagnetic valve body 32 abutting against the seat portion 75. The outside diameter of the trunk portion 82 is substantially equal to the bore diameter of the main hole portion 73. That is, the outside diameter of the trunk portion 82 is larger than the bore diameter of the retention ring 76. This allows the outer peripheral edge of the trunk portion 82 to face the inner peripheral edge of the retention ring 76 with a space in the axial direction therebetween. The neck portion 83 is inserted into the retention ring 76. The head portion 84 is tapered toward the second side.

Thus, when the movable core 53 is attracted, the movable core 53 is moved in the axial direction with respect to the electromagnetic valve body 32 until the outer peripheral edge of the trunk portion 82 abuts against the retention ring 76. When the outer peripheral edge of the trunk portion 82 abuts against the retention ring 76, the movable core 53 is moved in the axial direction together with the electromagnetic valve body 32.

(Check Valve Body 35)

The check valve body 35 is made of a resin material, for example. The check valve body 35 is formed in a tubular shape with one closed end, for example.

In the illustrated example, the check valve body 35 has a head portion 91, an inclined portion 92, a trunk portion 93, and a support portion 94, for example, arranged in this order from the first side. The head portion 91 and the inclined portion 92 are tapered toward the first side. The inclined portion 92, the trunk portion 93, and the support portion 94 are each formed in a tubular shape. The inclined portion 92 has side holes 95 that penetrate the inclined portion 92 in the radial direction. The outside diameter of the support portion 94 is smaller than the outside diameter of the trunk portion 93.

(Check Valve Spring 36)

The check valve spring 36 is a compression coil spring in the illustrated example. The check valve spring 36 is fitted with the outer periphery of the support portion 94 of the check valve body 35. The check valve spring 36 is housed in a compressed state between the trunk portion 93 and the bottom surface of the attachment hole 24. This allows the check valve spring 36 to bias the check valve body 35 toward the first side at all times.

(Plug 34)

The plug 34 is made of a metal material, for example. The plug 34 is fixed to the distal end portion 47 of the sleeve 31, and disposed between the sleeve 31 and the bottom surface of the attachment hole 24. The plug 34 covers an opening of the second flow path 23. The electromagnetic valve body 32 is disposed on the first side of the plug 34, and the check valve body 35 is housed in the plug 34 on the second side of the plug 34. That is, the check valve body 35 is disposed on the opposite side of the electromagnetic valve body 32 from the plug 34.

The plug 34 is formed in a stepped circular column shape, for example. The plug 34 has a pedestal portion 101, a receiving portion 102, a fixed portion 103, and a space forming portion 104 arranged in this order from the second side. The respective outside diameters of the pedestal portion 101, the receiving portion 102, the fixed portion 103, and the space forming portion 104 become smaller in this order.

The outside diameter of the pedestal portion 101 is smaller than the outside diameter of the large diameter portion 46 of the sleeve 31, and larger than the outside diameter of the distal end portion 47. Thus, the pedestal portion 101 faces the large diameter portion 46 of the sleeve 31 in the axial direction. A filter 105 and fourth seal members 106 disposed on both sides of the filter 105 in the axial direction are provided between the sleeve 31 and the pedestal portion 101. A surrounding space S1 is formed between the pedestal portion 101, the filter 105, and the fourth seal members 106 and the inner peripheral surface of the attachment hole 24.

The outside diameter of the receiving portion 102 is substantially equal to the outside diameter of the distal end portion 47. The outside diameter of the fixed portion 103 is slightly larger than the bore diameter of the distal end portion 47. While the fixed portion 103 has a tapered portion tapered toward the first side in the illustrated example, the outside diameter of the fixed portion 103 may be constant over the entire region in the axial direction. The plug 34 is fixed to the sleeve 31 by press-fitting the fixed portion 103 into the inner periphery of the distal end portion 47.

The plug 34 has a plurality of communication grooves 107. The communication grooves 107 are provided in the receiving portion 102 and the outer peripheral surface of the fixed portion 103, for example. The communication grooves 107 extend along the radial direction in the receiving portion 102, and extend along the axial direction in the fixed portion 103. That is, the communication grooves 107 are formed in an L-shape. Openings of the communication grooves 107 in the outer peripheral surface of the receiving portion 102 face the filter 105 in the radial direction. While the communication grooves 107 are provided at equal angular intervals in the circumferential direction of the plug 34 in the illustrated example, the communication grooves 107 may be provided at unequal intervals. The number of communication grooves 107 may be one, and is changeable as appropriate.

The outside diameter of the space forming portion 104 is smaller than the bore diameter of the sleeve 31. This allows an internal space S2 to be formed between the outer peripheral surface of the space forming portion 104 and the inner peripheral surface of the sleeve 31. The internal space S2 is connected to the first flow path 22 via the communication grooves 107 and the surrounding space S1.

The plug 34 has an internal flow path 111 and a check valve body housing hole 112 that is continuous with the internal flow path 111. The internal flow path 111 includes a first opening 113 opened and closed by the electromagnetic valve body 32, and a second opening 114 opened and closed by the check valve body 35. The internal flow path 111 is formed in a straight shape to extend along the axial direction, for example.

The first opening 113 is provided at the distal end, that is, an end portion on the first side, of the space forming portion 104. That is, the first opening 113 is connected to the first flow path 22 via the internal space S2, the communication grooves 107, and the surrounding space S1. The first opening 113 is formed in a tapered shape corresponding to the head portion 84 of the electromagnetic valve body 32. The first opening 113 is closed when the electromagnetic valve body 32 is seated on the peripheral edge portion of the first opening 113, and the first opening 113 is opened when the electromagnetic valve body 32 is separated from the peripheral edge portion of the first opening 113. That is, the peripheral edge portion of the first opening 113 of the plug 34 is used as a valve seat for the electromagnetic valve body 32. The pilot flow path 81 communicates with the internal flow path 111 with the first opening 113 closed.

The second opening 114 is formed in a tapered shape corresponding to the head portion 91 of the check valve body 35. The second opening 114 is closed when the check valve body 35 is seated on the peripheral edge portion of the second opening 114, and the second opening 114 is opened when the check valve body 35 is separated from the peripheral edge portion of the second opening 114. That is, the peripheral edge portion of the second opening 114 of the plug 34 is used as a valve seat for the check valve body 35. The side holes 95 do not communicate with the internal flow path 111 with the first opening 113 closed.

The check valve body 35 and the check valve spring 36 are housed in the check valve body housing hole 112. The check valve body 35 is movable in the axial direction while rubbing against the inner peripheral surface of the check valve body housing hole 112. The check valve body housing hole 112 has a stepped shape in which the bore diameter of the check valve body housing hole 112 is varied stepwise along the axial direction. Specifically, the check valve body housing hole 112 has a main hole portion 115 and an expanded diameter hole portion 116 provided on the distal end side of the main hole portion 115. The check valve body 35 is housed in the main hole portion 115 so as to be movable in the axial direction. The bore diameter of the expanded diameter hole portion 116 is larger than the bore diameter of the main hole portion 115. The second seal member 38 is fixed in the expanded diameter hole portion 116.

The second seal member 38 is made of a rubber material or a resin material. The second seal member 38 is formed in a circular ring shape, for example. The bore diameter of the second seal member 38 is substantially equal to the bore diameter of the main hole portion 115. The second seal member 38 is disposed so as to surround the second flow path 23 and pressed against the bottom surface of the attachment hole 24 via the plug 34 with the sleeve 31 located at the attachment position. This allows the second seal member 38 to seat the gap between the body 11 and the plug 34. In this state, the check valve body housing hole 112 communicates with the second flow path 23. That is, the second opening 114 of the internal flow path 111 is connected to the second flow path 23 via the check valve body housing hole 112.

(Operation of Composite Valve Sub Assembly 12)

Next, operation of the composite valve sub assembly 12 will be described.

As illustrated in FIG. 1, when power is not supplied to the solenoid coil 51, the movable core 53 is not attracted toward the fixed core 52. Therefore, the electromagnetic valve body 32 is biased toward the second side by the electromagnetic valve spring 54 via the movable core 53 to abut against the plug 34. This allows the first opening 113 to be closed by the electromagnetic valve body 32. In this state, a hydrogen gas in the gas tank 2 flows from the first flow path 22 into the surrounding space S1 of the attachment hole 24, and flows into the internal space S2 in the sleeve 31 via the filter 105 and the communication grooves 107. Since the first opening 113 is closed, however, the hydrogen gas does not flow into the internal flow path 111, and a flow of the hydrogen gas toward the second flow path 23 is regulated. The hydrogen gas flows from the internal space S2 into the spring housing hole 71 via the introduction groove 77 and the first introduction hole 78, and flows into the electromagnetic valve body housing hole 72 via the second introduction hole 79.

The check valve body 35 is biased toward the first side by the check valve spring 36 to abut against the plug 34. This allows the second opening 114 to be closed. In this state, a flow of a hydrogen gas from the second flow path 23 toward the first flow path 22 is regulated.

When supply of power to the solenoid coil 51 is started, the movable core 53 is attracted toward the fixed core 52. At this time, only the movable core 53 is moved in the first direction until the retention ring 76 is retained on the electromagnetic valve body 32. This allows the electromagnetic valve body 32 to be separated from the seat portion 75. Then, a hydrogen gas in the electromagnetic valve body housing hole 72 is introduced into the internal flow path 111 via the pilot flow path 81 of the electromagnetic valve body 32. Subsequently, when the retention ring 76 is retained on the electromagnetic valve body 32, the electromagnetic valve body 32 is moved in the first direction together with the movable core 53. This allows the first opening 113 to be opened by separating the electromagnetic valve body 32 from the plug 34. In this state, a hydrogen gas in the internal space S2 flows into the internal flow path 111 via the first opening 113.

After that, when a hydrogen gas flows in to increase the pressure in the internal flow path 111, the check valve body 35 is moved in the second direction against the biasing force of the check valve spring 36. This allows the second opening 114 to be opened. In this state, the hydrogen gas flows into the second flow path 23 through the second opening 114, the side holes 95, and the inside of the check valve body 35.

The composite valve sub assembly 12 functions as an electromagnetic valve and a check valve in the manner described above.

(Replacement of Composite Valve Sub Assembly 12)

Next, the work procedure for replacing the composite valve sub assembly 12 will be described.

To replace the composite valve sub assembly 12, it is necessary to first collect a hydrogen gas that remains in the gas tank 2.

Here, a case where the movable core 53 is stuck and has become immobile or a case where the solenoid coil 51 is not energized well, for example, is assumed. In this case, the first opening 113 cannot be opened by separating the electromagnetic valve body 32 of the composite valve sub assembly 12 from the plug 34.

Figure 3:
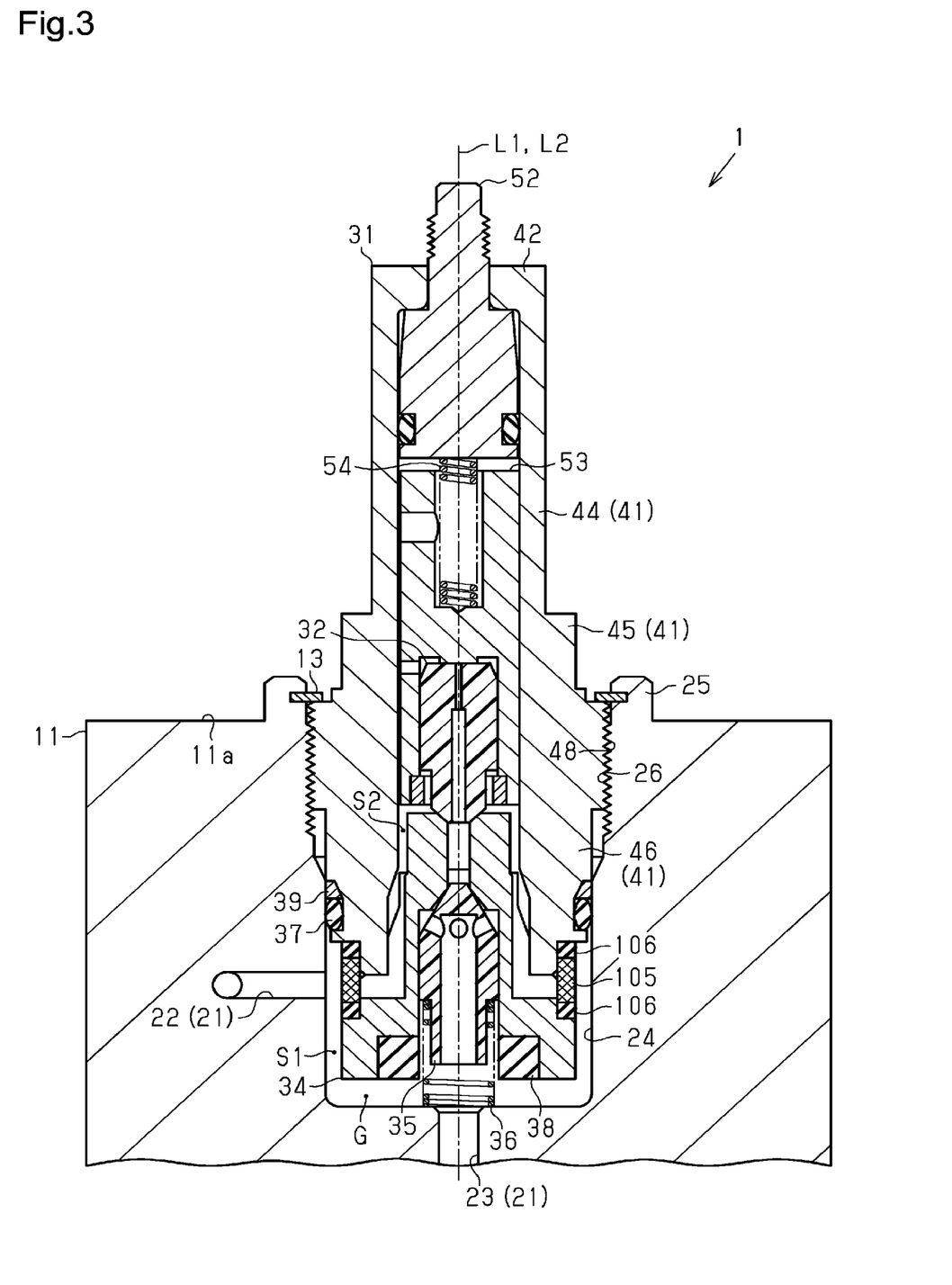
FIG. 3 is a sectional view of the valve assembly in FIG. 1 at the time of collecting a hydrogen gas in a gas tank.

Thus, in the valve assembly 1 according to the present embodiment, as illustrated in FIG. 3, the cover 14 is detached, and then the lock nut 66 and the solenoid coil 51 are detached. Subsequently, the sleeve 31 is rotated to move the sleeve 31 in the direction of getting out of the attachment hole 24, that is, in the first direction. Then, the plug 34 is moved in the first direction together with the sleeve 31, forming an axial clearance G between the plug 34 and the second seal member 38 and the bottom surface of the attachment hole 24.

At this time, when the large diameter portion 46 of the sleeve 31 abuts against the snap ring 13, further movement of the sleeve 31 in the first direction is regulated. This suppresses detachment of the sleeve 31 and leakage of a hydrogen gas from the attachment hole 24 before a hydrogen gas in the gas tank 2 is collected.

When the axial clearance G is formed, the first flow path 22 is connected to the second flow path 23 via the surrounding space S1 and the axial clearance G. As a result, a hydrogen gas flows from the first flow path 22 to the second flow path 23, without passing through the inside of the composite valve sub assembly 12, so that the hydrogen gas is collected in a gas tank 2 for collection (not illustrated) via a pipe. In this manner, a hydrogen gas in the gas tank 2 can be collected even if the first opening 113 of the composite valve sub assembly 12 cannot be opened.

When collection of a hydrogen gas in the gas tank 2 is completed, the composite valve sub assembly 12 is replaced by detaching the snap ring 13 and attaching a new composite valve sub assembly 12 in the attachment hole 24.

Next, the functions and effects of the present embodiment will be described.

(1) As described above, the composite valve sub assembly 12 can be used as an electromagnetic valve and a check valve. The composite valve sub assembly 12 is attached in the single attachment hole 24. Therefore, the internal structure of the body 11 can be simplified compared to when an attachment hole for attachment of an electromagnetic valve sub assembly and an attachment hole for a check valve sub assembly are individually formed in the body 11, for example.

In addition, the electromagnetic valve body 32 is inserted into the sleeve 31, and the plug 34 is fixed to the distal end portion 47 of the sleeve 31. Therefore, the check valve body 35 and the plug 34 can be collectively attached in the attachment hole 24 together with the sleeve 31. Thus, attachment of the composite valve sub assembly 12 to the body 11 is facilitated compared to a configuration in which the plug 34, the check valve body 35, and the sleeve 31 are separately attached in the attachment hole 24.

(2) The plug 34 further has a check valve body housing hole 112 that communicates with the internal flow path 111 and that houses the check valve body 35. Here, a valve assembly according to a comparative example in which a check valve body is housed in a second flow path, for example, is assumed. When it is attempted to replace a composite valve sub assembly in the comparative example, it is necessary to check whether a check valve body of a composite valve sub assembly that has been installed is smoothly movable in the second flow path after detaching a composite valve sub assembly from a body, complicating the replacement work. In this respect, with the above configuration, it is only necessary to check whether the check valve body 35 is smoothly movable in the check valve body housing hole 112 before performing the replacement work, facilitating the replacement work.

Further, the plug 34 has the check valve body housing hole 112 that houses the check valve body 35, making it easy to collectively attach the check valve body 35 and the check valve spring 36 in the attachment hole 24 together with the sleeve 31. This further facilitates attachment of the composite valve sub assembly 12 to the body 11.

(3) The surrounding space S1 is formed between the inner peripheral surface of the attachment hole 24 and the outer peripheral surface of the plug 34. The plug 34 further has the space forming portion 104 that forms the internal space S2 between the inner peripheral surface of the sleeve 31 and the space forming portion 104, the fixed portion 103 fixed to the sleeve 31, and the communication grooves 107 provided in the outer peripheral surface of the fixed portion 103 and communicating the surrounding space S1 with the internal space S2. The first opening 113 is provided at the distal end of the space forming portion 104, and connected to the first flow path 22 via the internal space S2, the communication grooves 107, and the surrounding space S1. With the above configuration, the first opening 113 is connected to the first flow path 22 using a clearance between the sleeve 31 and the plug 34, suppressing complication of the structure of the sleeve 31 and the plug 34.

(4) The first flow path 22 opens in the inner peripheral surface of the attachment hole 24, and the second flow path 23 opens in the bottom surface of the attachment hole 24. The composite valve sub assembly 12 further includes the first seal member 37 disposed between the inner peripheral surface of the attachment hole 24 and the outer peripheral surface of the sleeve 31 and closer to an opening end of the attachment hole 24 than the first flow path 22, and the second seal member 38 disposed between the bottom surface of the attachment hole 24 and an end surface of the plug 34 so as to surround the second flow path 23. The sleeve 31 is movable in the attachment hole 24 between the attachment position at which the second seal member 38 is compressed via the plug 34 and the relief position at which the second seal member 38 is not compressed while compressing the first seal member 37 to maintain the sealing performance.

With the above configuration, a hydrogen gas in the gas tank 2 can be released to the outside via the second flow path 23 by moving the sleeve 31 to the relief position. That is, the composite valve sub assembly 12 can be used as a manual pressure relief valve that allows a hydrogen gas in the gas tank 2 to be manually released. Therefore, it is not necessary to separately provide the valve assembly 1 with a manual pressure relief valve, simplifying the valve assembly 1.

(5) The plug 34 further has the receiving portion 102 that faces the distal end portion 47 of the sleeve 31 in the axial direction. With the above configuration, the plug 34 can be firmly pressed against the bottom surface of the attachment hole 24 with the sleeve 31 located at the attachment position.

(6) The valve assembly 1 further includes the snap ring 13 attached to the body 11 to regulate the sleeve 31 moving in the direction of getting out of the attachment hole 24 beyond the relief position. With the above configuration, it is possible to suppress the composite valve sub assembly 12 being erroneously moved to a position at which the first seal member 37 is not compressed when moving the composite valve sub assembly 12 to the relief position.

(7) The valve assembly 1 further includes the cover 14 that covers a portion of the composite valve sub assembly 12 exposed to the outside of the body 11. With the above configuration, it is possible to suppress foreign matter abutting against the composite valve sub assembly 12. The configuration also makes it difficult for an end user to access the composite valve sub assembly 12. Therefore, in a configuration in which the composite valve sub assembly 12 is movable to the relief position as in the present embodiment, it is possible to suppress a hydrogen gas in the gas tank 2 being released by an end user unintentionally moving the composite valve sub assembly 12 to the relief position.

(8) The plug 34 is disposed in the attachment hole 24 so as to cover an opening of the second flow path 23. The second opening 114 is connected to the second flow path 23 via the check valve body housing hole 112. With the above configuration, the second opening 114 can be easily connected to the second flow path 23.

The present embodiment can be implemented as modified as follows. The present embodiment and the following modifications can be implemented in combination with each other in a technically consistent range.

While the sleeve 31 is moved to the relief position after detaching the solenoid coil 51 when collecting a hydrogen gas in the gas tank 2, the sleeve 31 may be moved to the relief position with the solenoid coil 51 kept fixed at the outer periphery of the sleeve 31.

The electromagnetic valve body 32 may not be constituted as a pilot valve. In this case, the electromagnetic valve body 32 may be coupled to the movable core 53 such that the electromagnetic valve body 32 is always moved together with the movable core 53.

While the electromagnetic valve body 32 and the check valve body 35 are made of a resin material, this is not limiting, and the electromagnetic valve body 32 and the check valve body 35 may be made of a metal material, for example. In this case, only a peripheral edge portion of the first opening 113 and a peripheral edge portion of the second opening 114 of the plug 34 may be made of a resin material, or the entire plug 34 may be made of a resin material.

The valve assembly 1 may not include the cover 14.

While the snap ring 13 is a snap ring, this is not limiting, and the snap ring 13 may be a ring-shaped bolt screwed into the inner periphery of the protrusion 25, for example.

While the snap ring 13 is attached at the inner periphery of the protrusion 25, this is not limiting, and the snap ring 13 may be attached at any position as long as the sleeve 31 can abut against the snap ring 13. For example, the snap ring 13 may be attached at an opening end of the attachment hole 24. In this case, it is not necessary to provide the body 11 with the protrusion 25. Further, the valve assembly 1 may not include the snap ring 13.

The plug 34 may not have the check valve body housing hole 112. In this case, the check valve body 35 and the check valve spring 36 may be housed at an opening end of the second flow path 23, for example. In this case, in addition, the second opening 114 may be directly connected to the second flow path 23.

While the plug 34 is fixed to the sleeve 31 by press-fitting, this is not limiting, and the plug 34 may be fixed to the sleeve 31 through screwing or clinching, for example.

The plug 34 may not be provided with the communication grooves 107, and communication grooves may be provided in the inner peripheral surface of the sleeve 31, and the internal space S2 may be communicated with the surrounding space S1 via the communication grooves. Alternatively, the sleeve 31 may be provided with communication holes that penetrate the sleeve 31 in the radial direction, and the internal space S2 may be communicated with the surrounding space S1 via the communication holes, for example.

The plug 34 may not have the pedestal portion 101 and the receiving portion 102.

While the sleeve 31 is attached in the attachment hole 24 in the body 11 through screwing, this is not limiting, and the sleeve 31 may be attached in the attachment hole 24 in the body 11 through press-fitting, for example. Alternatively, the sleeve 31 may be attached in the attachment hole 24 in the body 11 through welding, for example, making the sleeve 31 immovable in the attachment hole 24.

While the sleeve 31 is formed in a cylindrical shape with one closed end, the shape of the sleeve 31 is changeable as appropriate. For example, the peripheral wall 41 of the sleeve 31 may be in a cylindrical shape with a constant outside diameter. Alternatively, the sleeve 31 may not have the end wall 42, for example.

The composite valve sub assembly 12 may be attached in the attachment hole 24 such that the entire composite valve sub assembly 12 is inserted into the attachment hole 24.

While the valve assembly 1 controls the flow of a hydrogen gas at a high pressure, this is not limiting, and the valve assembly 1 may control the flow of a gas other than a hydrogen gas.

Next, technical ideas that can be grasped from the above embodiment and modifications will be additionally described below.

(Appendix 1) In one aspect of the present disclosure, the solenoid actuator may include: a fixed core fixed to the sleeve: a movable core movably housed in the sleeve and coupled to the electromagnetic valve body: an electromagnetic valve body biasing member that biases the electromagnetic valve body toward the first opening via the movable core; and a solenoid coil that causes the fixed core to generate a magnetic force that attracts the movable core.

(Appendix 2) In one aspect of the present disclosure, the composite valve sub assembly may further include a check valve body biasing member that biases the check valve body toward the second opening.

The invention claimed is:

1. A valve assembly comprising:
a body; and
a composite valve sub assembly attached to the body, wherein:
the body includes
a gas flow path including a first flow path configured to be connected to a gas tank and a second flow path configured to be connected to an external device, and
a single attachment hole that communicates with each of the first flow path and the second flow path;
the composite valve sub assembly includes
a tubular sleeve inserted into the attachment hole,
an electromagnetic valve body housed in the sleeve,
a solenoid actuator configured to move the electromagnetic valve body in the sleeve,
a plug fixed at an end portion of the sleeve and disposed between the sleeve and a bottom surface of the attachment hole, and
a check valve body disposed on an opposite side of the electromagnetic valve body from the plug;
the plug has an internal flow path including a first opening connected to the first flow path and opened and closed by the electromagnetic valve body, and a second opening connected to the second flow path and opened and closed by the check valve body, and the plug is configured to be moved in a direction of getting out of the attachment hole together with the sleeve by moving the sleeve in the direction of getting out; and
the valve assembly is configured such that a gas flows from the first flow path to the second flow path, without passing inside the composite valve sub assembly, when the plug is moved in the direction of getting out together with the sleeve.

2. The valve assembly according to claim 1, wherein the plug further has a valve body housing hole that communicates with the internal flow path and that houses the check valve body.

3. The valve assembly according to claim 1, wherein:
a surrounding space is formed between an inner peripheral surface of the attachment hole and an outer peripheral surface of the plug;
the plug further has
a space forming portion that forms an internal space between an inner peripheral surface of the sleeve and the space forming portion,
a fixed portion fixed to the sleeve, and
a communication groove provided in an outer peripheral surface of the fixed portion and communicating the surrounding space with the internal space; and
the first opening is provided in the space forming portion, and connected to the first flow path via the internal space, the communication groove, and the surrounding space.

4. The valve assembly according to any one of claim 1, wherein:
- the first flow path opens in an inner peripheral surface of the attachment hole;
- the second flow path opens in a bottom surface of the attachment hole;
- the composite valve sub assembly further includes
  - a first seal member disposed between the inner peripheral surface of the attachment hole and an outer peripheral surface of the sleeve and closer to an opening end of the attachment hole than the first flow path, and
  - a second seal member disposed between the bottom surface of the attachment hole and an end surface of the plug so as to surround the second flow path; and
- the sleeve is configured to be movable in the attachment hole between an attachment position at which the second seal member is compressed via the plug and a relief position at which the second seal member is not compressed while maintaining the first seal member in a compressed state.

5. The valve assembly according to claim 4, wherein the plug further has a receiving portion that faces an end portion of the sleeve in an axial direction.

6. The valve assembly according to claim 4, further comprising a snap ring attached to the body to regulate the sleeve moving in a direction of getting out of the attachment hole beyond the relief position.

7. The valve assembly according to any one of claim 1, further comprising a cover attached to the body to cover a portion of the composite valve sub assembly exposed to an outside of the body.

\* \* \* \* \*